United States Patent
Khaleghimeybodi et al.

(10) Patent No.: US 11,589,176 B1
(45) Date of Patent: Feb. 21, 2023

(54) CALIBRATING AN AUDIO SYSTEM USING A USER'S AUDITORY STEADY STATE RESPONSE

(71) Applicant: META PLATFORMS TECHNOLOGIES, LLC, Menlo Park, CA (US)

(72) Inventors: Morteza Khaleghimeybodi, Bothell, WA (US); Nils Thomas Fritiof Lunner, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 23 days.

(21) Appl. No.: 17/389,095

(22) Filed: Jul. 29, 2021

Related U.S. Application Data

(60) Provisional application No. 63/058,813, filed on Jul. 30, 2020.

(51) Int. Cl.
| | |
|---|---|
| *H04R 29/00* | (2006.01) |
| *H04R 3/04* | (2006.01) |
| *G02B 27/01* | (2006.01) |
| *H04R 5/033* | (2006.01) |
| *H04R 5/04* | (2006.01) |

(52) U.S. Cl.
CPC ......... *H04R 29/001* (2013.01); *G02B 27/017* (2013.01); *H04R 3/04* (2013.01); *H04R 5/033* (2013.01); *H04R 5/04* (2013.01)

(58) Field of Classification Search
CPC ........ H04R 29/001; H04R 3/04; H04R 5/033; H04R 5/04; G02B 27/017
USPC .................................. 381/26, 58, 60, 74, 95
See application file for complete search history.

(56) References Cited

U.S. PATENT DOCUMENTS

| | | | |
|---|---|---|---|
| 8,271,075 B2 * | 9/2012 | Chuang ................ | H04R 1/1008 600/544 |
| 9,497,530 B1 * | 11/2016 | Campbell ............. | G06F 16/636 |
| 10,154,333 B2 * | 12/2018 | Campbell ............. | H04R 27/02 |
| 10,757,501 B2 * | 8/2020 | Mehra .................... | H04R 1/105 |
| 11,470,428 B2 * | 10/2022 | Khaleghimeybodi | ...................... H04R 25/305 |

(Continued)

OTHER PUBLICATIONS

Christensen C.B., et al., "Ear-EEG-Based Objective Hearing Threshold Estimation Evaluated on Normal Hearing Subjects," IEEE Transactions on Biomedical Engineering, vol. 65, No. 5, May 2018, pp. 1026-1034.

(Continued)

*Primary Examiner* — Xu Mei
(74) *Attorney, Agent, or Firm* — Fenwick & West LLP

(57) ABSTRACT

An audio system is described for calibrating one or more transducers for a user using the auditory steady state response (ASSR) of the user. The audio system presents an audio calibration signal to the user via a transducer array in the headset. The system measures electrical signals that are generated in the auditory cortex of the brain of the user in response to the presented audio calibration signal. The audio system determines an ASSR of the user based on the measured electrical signals. The audio system determines a value for one or more sound filter parameter based on the determined ASSR and a model. The audio system calibrates the transducer array using the determined sound filter parameters. The calibrated transducer array is used to present audio content to the user.

20 Claims, 6 Drawing Sheets

(56) References Cited

U.S. PATENT DOCUMENTS

2005/0018858 A1* 1/2005 John ................ A61B 5/121
381/60

OTHER PUBLICATIONS

Christensen C.B., et al., "Toward EEG-Assisted Hearing Aids: Objective Threshold Estimation Based on Ear-EEG n Subjects With Sensorineural Hearing Loss," Trends in Hearing, vol. 22, 2018, 13 pages.

* cited by examiner

400

```
┌─────────────────────────────────────────────────────────────┐
│ Present an audio calibration signal to a user via one or more │
│     transducers of a plurality of transducers on a headset    │
│                            410                                │
└─────────────────────────────────────────────────────────────┘
                              │
                              ▼
┌─────────────────────────────────────────────────────────────┐
│ Measure electrical signals generated at a head of the user in │
│      response to the presented audio calibration signal       │
│                            420                                │
└─────────────────────────────────────────────────────────────┘
                              │
                              ▼
┌─────────────────────────────────────────────────────────────┐
│ Determine an auditory steady state response (ASSR) of the user│
│            based on the measured electrical signals           │
│                            430                                │
└─────────────────────────────────────────────────────────────┘
                              │
                              ▼
┌─────────────────────────────────────────────────────────────┐
│  Determine a value for one or more filter parameters based on │
│               the determined ASSR and a model                 │
│                            440                                │
└─────────────────────────────────────────────────────────────┘

┌─────────────────────────────────────────────────────────────┐
│ Calibrate at least one of the transducers of the plurality of │
│ transducers on the headset based on the determined sound      │
│                    filter parameters                          │
│                            450                                │
└─────────────────────────────────────────────────────────────┘
                              │
                              ▼
┌─────────────────────────────────────────────────────────────┐
│ Provide audio content to the user using the calibrated        │
│          transducers of the plurality of transducers          │
│                            460                                │
└─────────────────────────────────────────────────────────────┘
```

CALIBRATING AN AUDIO SYSTEM USING A USER'S AUDITORY STEADY STATE RESPONSE

CROSS-REFERENCE TO RELATED APPLICATIONS

This application claims the benefit of U.S. Provisional Application No. 63/058,813, filed Jul. 30, 2020, which is incorporated by reference in its entirety.

FIELD OF THE INVENTION

This disclosure relates generally to calibrating an audio system in a headset, and specifically relates to calibrating an audio system using an auditory steady state response (ASSR) of a user.

BACKGROUND

Headsets often include features such as audio systems to provide audio content to users of the headsets. The audio content may be provided to the user using speakers. The speakers are typically calibrated at the factory but are not specifically calibrated to the user. Accordingly, conventional systems may not be equalized for each user. There may be variations in a fit of the head mounted system and changes in positions of the head mounted system with respect to each user, which may cause changes in audio output of the system. There may also be different hearing loss or hearing impairments for a user. Therefore, depending on the head and ear geometries of the user as well as how a speaker is configured with respect to the ear, and the user's hearing profile, each user may perceive sound differently. Conventionally a microphone is placed at the entrance to the ear-canal to sense the created sound pressure and subsequently achieve calibration and equalization. However, such placement may be socially less acceptable.

SUMMARY

An audio system is described herein that is calibrated for a user using the ASSR of the user. The audio system is part of a head mounted system (e.g., headset and/or in-ear devices) and provide audio content to a user of the head mounted system. The audio system may also be part of a standalone audio device that may be paired with other client devices such as a smart phone and a laptop computer, etc. The audio system may use a transducer array to provide the audio content to the user. The transducer assembly may include one or more speakers, one or more bone conduction transducers, one or more cartilage conduction transducers, or some combination thereof. In embodiments described herein, the transducer array is calibrated to generate customized sound filters for the user, account for any variations in a fit of the head mounted system and changes in positions of the head mounted system with respect to the user, and to account for and compensate any potential hearing loss or hearing impairment of the user.

In embodiments described herein, the audio system presents an audio calibration signal to the user via at least one transducer of a plurality of transducers on a headset. The system measures electrical signals that are generated in the auditory cortex of the brain of the user in response to the presented audio calibration signal. The audio system determines an ASSR of the user based on the measured electrical signals. The audio system determines a value for one or more sound filter parameter based on the determined ASSR and a model. The audio system calibrates the at least one transducer of the plurality of transducers using the determined sound filter parameters. The at least one calibrated transducer is used to present audio content to the user.

Embodiments described herein include a non-transitory computer-readable storage medium comprising computer program instructions that, when executed by a computer processor of an online system, cause the processor to perform steps for calibrating an audio system for a user using the ASSR of the user. The performed steps include presenting an audio calibration signal to the user via at least one transducer of a plurality of transducers on a headset, measuring electrical signals that are generated in the auditory cortex of the brain of the user in response to the presented audio calibration signal, determining an ASSR of the user based on the measured electrical signals, determining a value for one or more sound filter parameter based on the determined ASSR and a model, calibrating the at least one transducer of the plurality of transducers using the determined sound filter parameters, and using the at least one calibrated transducer to present audio content to the user.

In embodiments described herein, the audio system comprises a transducer assembly, an electrode assembly, and a controller. The transducer assembly includes a plurality of transducers that are positioned on a head mounted system. The plurality of transducers is configured to present an audio calibration signal to a user. The electrode assembly includes a plurality of electrodes that are positioned on the head mounted system. The plurality of electrodes is configured to measure electrical signals generated within a head of the user in response to the audio calibration signal. The controller is within the head mounted system. The controller is configured to determine an audio steady state response (ASSR) of the user using the measured electrical signals. The controller determines a value for a sound filter parameter using the ASSR and a model, wherein the model maps different ASSRs to corresponding values of the filter parameter. The controller generates a sound filter using the value for the filter parameter. The generated sound filter calibrates at least one transducer of the plurality of transducers to the user. The controller applies the sound filter to audio content to generate calibrated audio content and instructs the transducer assembly to present the calibrated audio content.

BRIEF DESCRIPTION OF THE DRAWINGS

FIG. 4 is a flowchart illustrating a process for calibrating an audio system, in accordance with one or more embodiments.

Figure 1A:
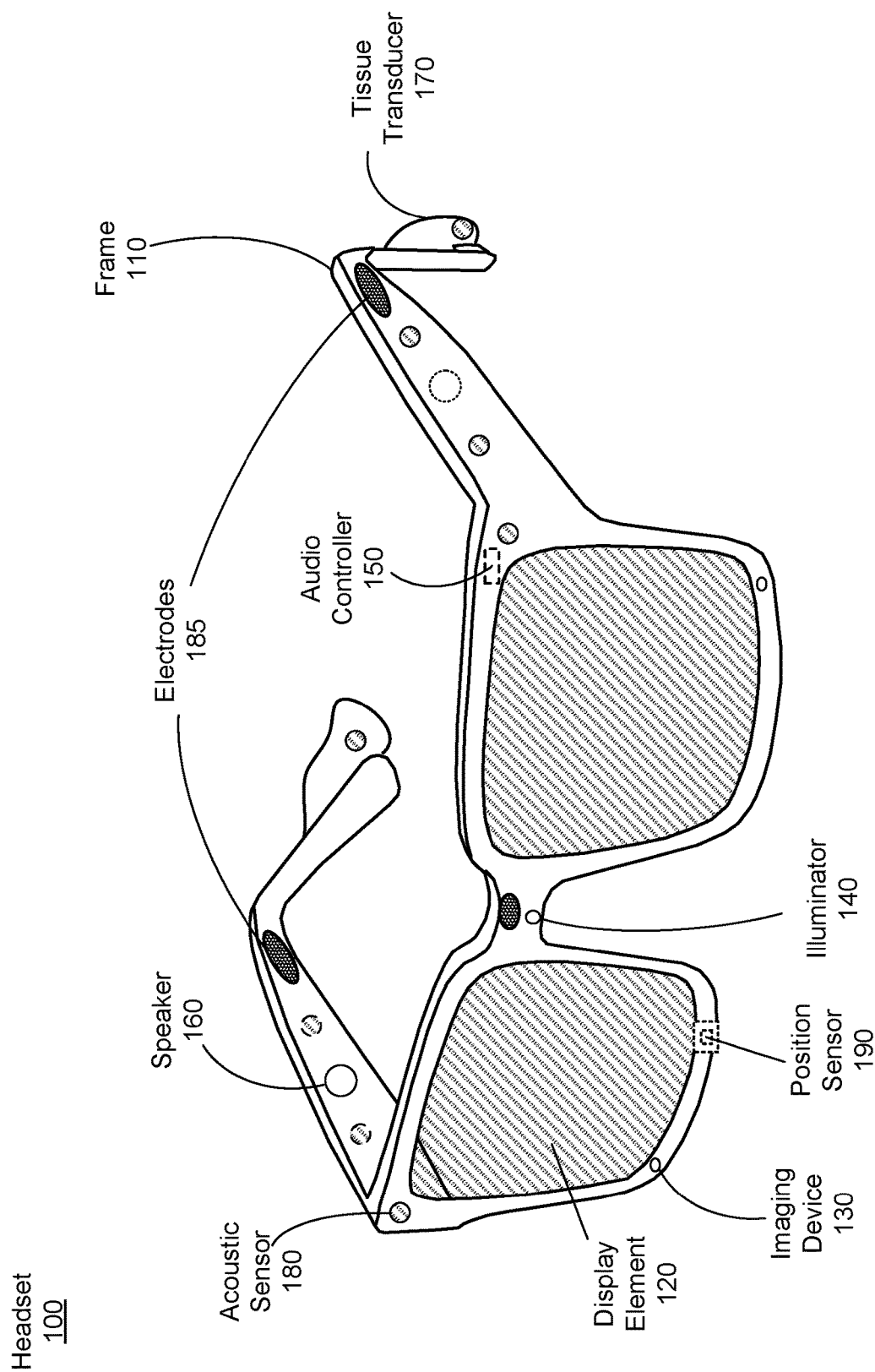
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio system is described herein that is calibrated for a user using ASSR. The audio system is part of a head mounted system (e.g., a headset and/or in-ear devices) and provides audio content to a user of the head mounted system. The calibration may be performed to generate customized sound filters for the user, to account for any variations in a fit of the head mounted system and changes in positions of the head mounted system with respect to the user, to account for and compensate any potential hearing loss or hearing impairment of the user, or some combination thereof. The audio system may use a transducer array to provide the audio content to the user. The transducer array may include one or more speakers and/or one or more tissue conduction transducers (such as one or more bone conduction transducers, one or more cartilage conduction transducers, or some combination thereof).

In embodiments described herein, the audio system presents an audio calibration signal to the user. In some embodiments, the audio calibration signal may be one or more of: an amplitude modulated (AM) tone, an amplitude modulated noise signal, a frequency modulated tone with one or more different carrier frequencies, a click, and a chirp, or some combination thereof. The system measures electrical signals that are generated in the auditory cortex of the brain of the user in response to the presented calibration signal. The system measures the electrical signals generated at the head of the user using electrodes that are part of an electrode assembly that is located on the head mounted system. In some embodiments, the electrodes may be electroencephalogram (EEG) electrodes. Based on the measured electrical signals, the audio system determines an ASSR of the user. The ASSR is an electrophysiological response comprising electrical impulses evoked on the head of the user by auditory stimuli. It can be viewed as an auditory-evoked neural potential that follows the envelope of a complex stimulus. It may be elicited by presenting modulated tones. For example, an ASSR may be evoked by a periodically repeated (rapid) auditory stimulus. A system may evoke an ASSR using amplitude-modulated (AM) or frequency-modulated (FM) stimuli (e.g., 0.5, 1, 2, 4 kHz) with the goal of creating an estimated audiogram to predict hearing sensitivity. However, in embodiments herein, the evoked ASSR is determined using the measured electrical signals from the electrodes of the electrode assembly in order to calibrate the transducer array in the audio system.

The determined ASSR is used with a model by the audio system to determine a value for one or more audio filter parameters of the audio system. The filter parameters are used to calibrate the transducer array.

While conventionally a microphone is placed at the entrance to the ear-canal to sense the created sound pressure and perform calibration and equalization, there are advantages to instead using an electrode assembly with electrodes for measuring the electrical signals on the head of the user and achieve calibration. One advantage is that in embodiments described herein, the electrodes are embedded into the frame of the head mounted system. Such placement makes them not visible to others, in contrast to a visibly obtrusive placement of a microphone at the entrance of the ear canal of the user. Another advantage is that measuring evoked potentials of the ASSR ensures that any hearing impairment of the user will be automatically taken into account during the calibration. In contrast, with the use of a microphone, the potential hearing loss of the subject will need to be characterized and compensated by additional methods in the audio system. Furthermore, placing a microphone at the entrance to the ear-canal may negatively affect the spatial sound as the presence of the microphone can change the acoustics of the pinna and concha cavity. This is avoided with the use of the electrode assembly and ASSR measurement to achieve calibration.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In some embodiments, the headset 100 may be a client device. In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents audio content to the user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate audio signals. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The sensor array includes a plurality of electrodes 185 that form an electrode assembly. The electrodes 185 measure electrical signals generated within a head of the user in response to an audio signal. The electrodes 185 are coupled to and/or attached to different portions of the head mounted system and are in direct contact with the skull or soft tissues of the head. As illustrated, the electrodes 185 are located on the frame, at the nose bridge as well as the end pieces of the frame but in other embodiments, the portions of the head mounted system that may include the electrodes 185 may be, e.g., portions of a frame of a headset, the temples of the frame, a bridge of the frame, a band of the headset, portions in contact with the nose, portions in contact with the forehead, some other portion of the headset, portions of in-ear devices, portions of hearing aids, portions of hearables, or some combination thereof.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

In embodiments described herein, the audio controller 150 calibrates the transducer array (which may include the speakers 160 and/or the tissue transducers 170) based on information received from the sensor array. The audio controller 150 presents one or more calibration signals to the user using the transducers. In response to the presentation of the calibration signal, the plurality of electrodes 185 measure electrical potentials across the head of the user. The audio controller 150 processes the electrical potentials measured at the electrodes 185 to determine the ASSR of the user. The audio controller 150 uses the measured ASSR along with a stored model to calibrate the transducer array.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
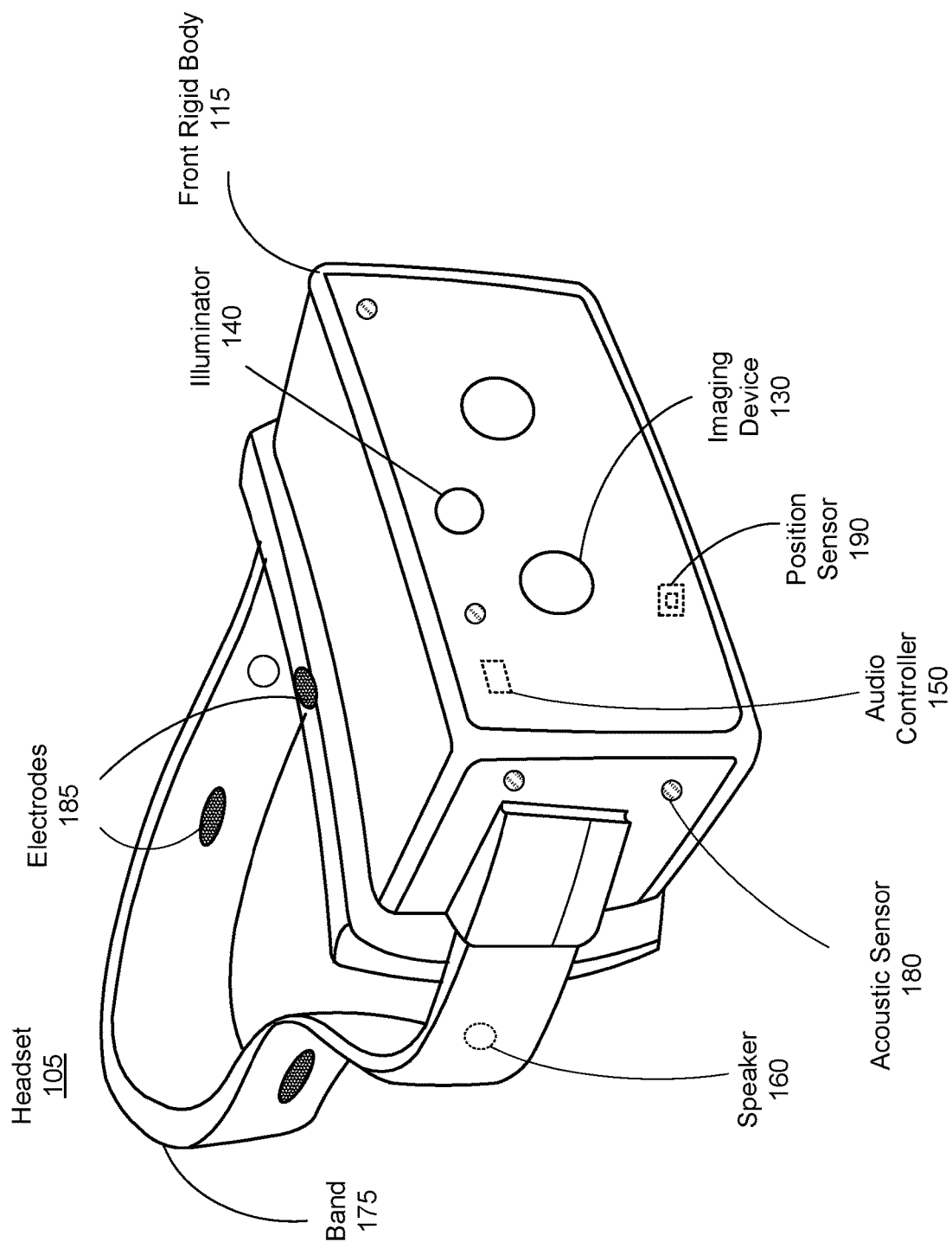
FIG. 1B is a perspective view of a headset implemented as a head-mounted display, in accordance with one or more embodiments.

FIG. 1B is a perspective view of a headset 105 implemented as a HMD, in accordance with one or more embodiments. In some embodiments, the headset 105 is a client device. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, a plurality of electrodes 185 of an electrode assembly, and the position sensor 190. The speakers 160 may be part of a transducer array (not shown) that also includes tissue transducers (e.g., a bone conduction transducer or a cartilage conduction transducer). The speakers 160 are shown located in various locations, such as coupled to the band 175 (as shown), coupled to front rigid body 115, or may be configured to be inserted within the ear canal of a user. The electrodes of the electrode assembly may be located at various portions of the HMD such that they are in direct contact with the skull of the user.

Figure 2:
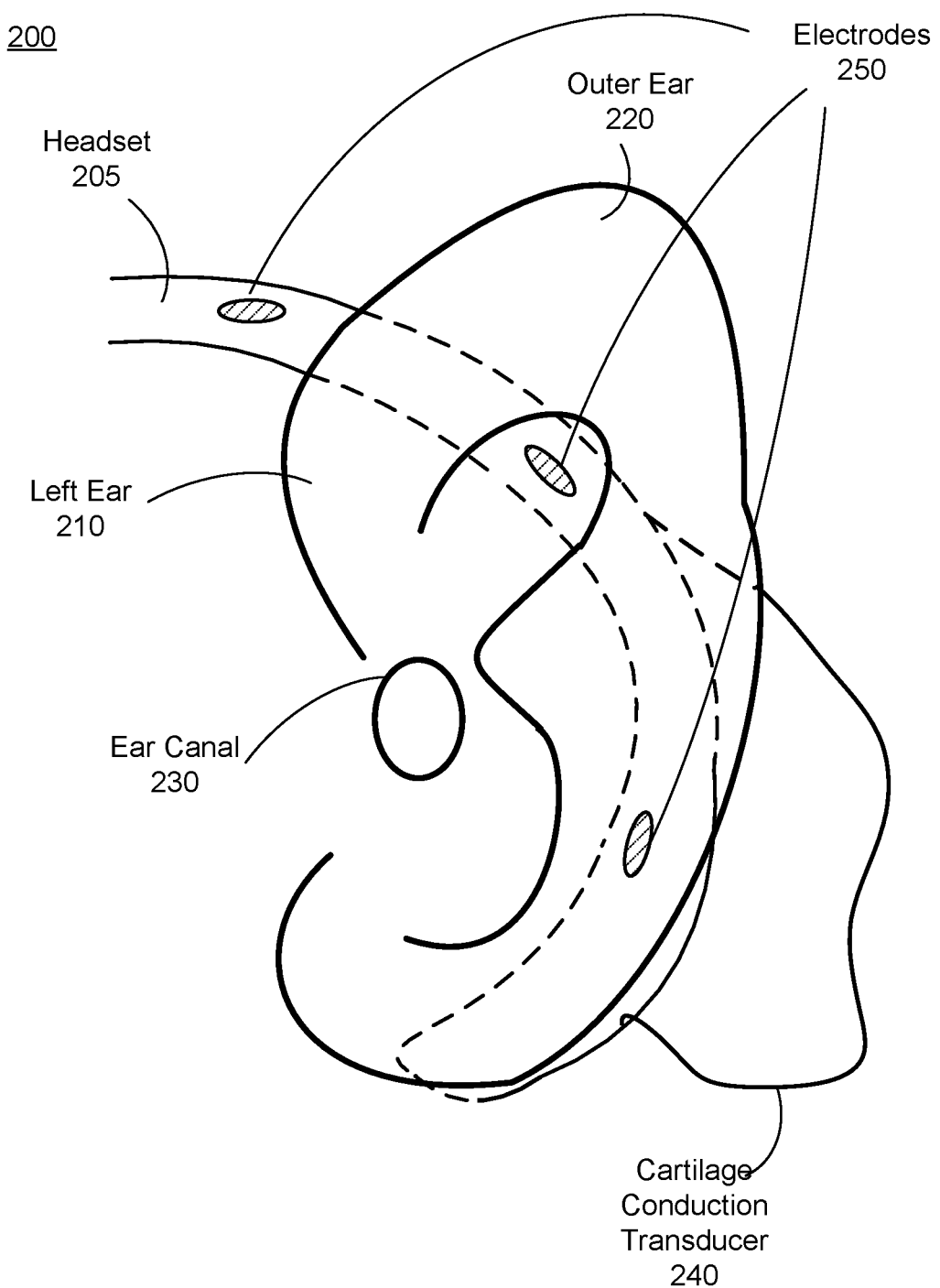
FIG. 2 is a profile view of a portion of the audio systems as a component of a headset, in accordance with one or more embodiments

FIG. 2 is a profile view 200 of a portion of an audio system that is used at an ear of a user as a component of a headset 205, in accordance with one or more embodiments. Although FIG. 2 illustrates an embodiment for a left ear 210, in other embodiments, it may also and/or alternatively be for a right ear. The profile view 200 depicts an outer ear 220 and an ear canal 230 for providing context. The headset 205 is an embodiment of the headset 100. In the depicted view, the audio system includes, among other components, at least one cartilage conduction transducer 240 that is part of a transducer array of the audio system, and a plurality of electrodes 250 that are part of a sensor array of the audio system. The electrodes 250 are an embodiment of the electrodes 185 in FIG. 1A. While FIG. 2 illustrates a single cartilage conduction transducer 240, in other embodiments, there may be one or more speakers, one or more bone conduction transducers and one or more cartilage conduction transducers.

The electrodes 250 measure electrical signals generated within a head of the user in response to an audio signal presented to the user by the audio system. The electrodes 250 are coupled to and/or attached to different portions of the head mounted system and are in direct contact with the skull. The electrodes 250 work in conjunction with other electrodes located in other portions of the headset 205, such as a bridge that is also part of the headset 100 located on the nose of the user (not shown). In some embodiments, as the physical distance between the located electrodes increases, the measured signals from the electrodes get better signal to noise ratios, due to its differential measurement principles.

In an example use case, a calibration signal comprising a set of modulated tones may be presented by the cartilage conduction transducers 240 to the user. The electrodes 250 measure the elicited electrical signals generated where they are located in contact with the head of the user. The audio system, of which the headset 205 is a part, determines the ASSR of the user based on the measurements received from the electrodes 250. The audio system determines values for sound filter parameters based on the determined ASSR and a model, and subsequently may calibrate the cartilage conduction transducer 240 based on the determined sound filter parameters. The calibrated cartilage conduction transducers 240 may subsequently be used by the audio system to provide audio content to the user via headset 100.

Figure 3:
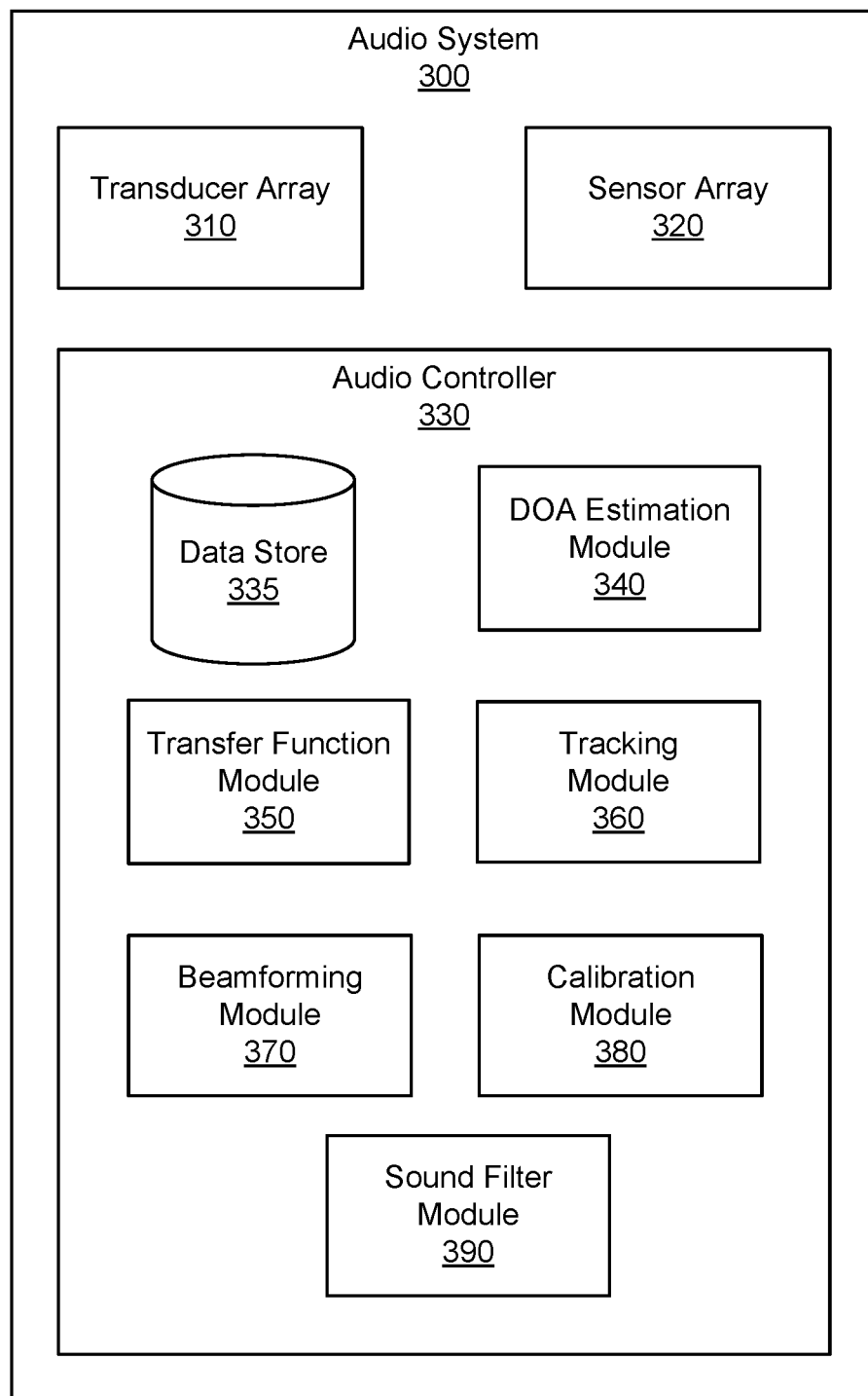
FIG. 3 is a block diagram of an audio system, in accordance with one or more embodiments.

FIG. 3 is a block diagram of an audio system 300, in accordance with one or more embodiments. The audio system in FIG. 1A or FIG. 1B may be an embodiment of the audio system 300. The audio system 300 generates one or more acoustic transfer functions for a user. The audio system 300 may then use the one or more acoustic transfer functions to generate audio content for the user. In the embodiment of FIG. 3, the audio system 300 includes a transducer array 310, a sensor array 320, and an audio controller 330. Some embodiments of the audio system 300 have different components than those described here. Similarly, in some cases, functions can be distributed among the components in a different manner than is described here.

The transducer array 310 is configured to present audio content. The transducer array 310 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 310 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 310 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 330, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 310 generates audio content in accordance with instructions from the audio controller 330. The transducer array 310 may generate audio content using one or more speakers, one or more bone conduction transducers, one or more cartilage conduction transducers, or some combination thereof. In some embodiments, the audio content is one or more audio calibration signals. In some embodiments, the audio calibration signals are generated by the one or more cartilage conduction transducers based on instructions from the audio controller 330. The audio calibration signals may be one or more of amplitude modulated (AM) or frequency-modulated (FM) tones with different carrier frequencies (CF), amplitude modulated noise, a chirp, click, some other sound, or some combination thereof, in accordance with instructions received from the audio controller.

In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 300. The transducer array 310 may be coupled to a wearable device (e.g., the headset 100 or the headset 105). In alternate embodiments, the transducer array 310 may be a plurality of speakers that are separate from the wearable device (e.g., coupled to an external console).

The sensor array 320 detects sounds within a local area surrounding the sensor array 320. The sensor array 320 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 320 is configured to monitor the audio content generated by the transducer array 310 using at least some of the plurality of acoustic sensors. Increasing the number of sensors may improve the accuracy of information (e.g., directionality) describing a sound field produced by the transducer array 310 and/or sound from the local area.

The sensor array 320 includes an electrode assembly with a plurality of electrodes (such as the electrodes 185 depicted in FIG. 1A, FIG. 1B, and FIG. 2). The electrode assembly measures electrical signals generated within a head of the user in response to an audio signal. The electrode assembly includes a plurality of electrodes that are coupled to and/or attached to different portions of the head mounted system and are in direct contact with the skull. The portions of the head mounted system that may include the electrodes may be, e.g., portions of a frame of a headset, the temples of the frame, a bridge of the frame, a band of the headset, portions in contact with the nose, portions in contact with the forehead, some other portion of the headset, portions of in-ear devices, portions of hearing aids, portions of hearables, or some combination thereof. The plurality of electrodes may be electroencephalogram (EEG) electrodes that are configured to measure electrical signals on the skull of the user generated from brain activity. In particular, the EEG electrodes are distributed on the headset such that they are located to be in contact with portions of the head of the user. The measured signals from the electrodes are used to determine the ASSR neural electrical potentials that are evoked in response to presenting the calibration signals to the user through the transducer array 310. The plurality of EEG electrodes in the sensor array 320 includes at least one electrode that may be a reference electrode and a plurality of electrodes that are data electrodes. The plurality of EEG electrodes in the sensor array 320 may also include a ground electrode. In embodiments with a glasses form-factor, the reference electrode may be placed close to and/or in contact with the nose and/or the forehead, while the data electrodes may be placed along the temples and/or ends of the temples close to the ear.

The audio controller 330 controls operation of the audio system 300. In the embodiment of FIG. 3, the audio controller 330 includes a data store 335, a DOA estimation module 340, a transfer function module 350, a tracking module 360, a beamforming module 370, a calibration module 380, and a sound filter module 390. The audio controller 330 may be located inside a headset, in some embodiments. Some embodiments of the audio controller 330 have different components than those described here. Similarly, functions can be distributed among the components in different manners than described here. For example, some functions of the controller may be performed external to the headset. The user may opt in to allow the audio controller 330 to transmit data captured by the headset to systems external to the headset, and the user may select privacy settings controlling access to any such data.

The data store 335 stores data for use by the audio system 300. Data in the data store 335 may include sounds recorded in the local area of the audio system 300, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 300, or any combination thereof. Data in the data store 335 may also include data that is received from an audio server (e.g., the audio server 525 in FIG. 5) for use by the audio system. In some embodiments, the data store 335 may store acoustic parameters that describe acoustic properties of the local area. The stored acoustic parameters may include, e.g., a reverberation time, a reverberation level, a room impulse response, etc. In some embodiments, the data in the data store 335 includes model information that is generated and provided by a mapping server. In some embodiments, the model information may be associated with a trained machine learning model that is received from the mapping server. The model information provides a mapping between measured ASSR values and sound filter parameter values. In some embodiments, the model information may be in the form of one or more look-up tables that map ASSR values to sound filter parameter values for one or more frequency bands. In some embodiments, the look-up tables may be generated from the trained machine learning model.

The DOA estimation module 340 is configured to localize sound sources in the local area based in part on information from the sensor array 320. Localization is a process of determining where sound sources are located relative to the user of the audio system 300. The DOA estimation module 340 performs a DOA analysis to localize one or more sound sources within the local area. The DOA analysis may include analyzing the intensity, spectra, and/or arrival time of each sound at the sensor array 320 to determine the direction from which the sounds originated. In some cases, the DOA analysis may include any suitable algorithm for analyzing a surrounding acoustic environment in which the audio system 300 is located.

For example, the DOA analysis may be designed to receive input signals from the sensor array 320 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 320 received the direct-path audio signal. The determined angle may then be used to identify the DOA for the received input signal. Other algorithms not listed above may also be used alone or in combination with the above algorithms to determine DOA.

In some embodiments, the DOA estimation module 340 may also determine the DOA with respect to an absolute position of the audio system 300 within the local area. The position of the sensor array 320 may be received from an external system (e.g., some other component of a headset, an artificial reality console, an audio server, a position sensor (e.g., the position sensor 190), etc.). The external system may create a virtual model of the local area, in which the local area and the position of the audio system 300 are mapped. The received position information may include a location and/or an orientation of some or all of the audio system 300 (e.g., of the sensor array 320). The DOA estimation module 340 may update the estimated DOA based on the received position information.

The transfer function module 350 is configured to generate one or more acoustic transfer functions. Generally, a transfer function is a mathematical function giving a corresponding output value for each possible input value. Based on parameters of the detected sounds, the transfer function module 350 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 320. Accordingly, for a sound source there is a corresponding transfer function for each of the acoustic sensors in the sensor array 320. And collectively the set of transfer functions is referred to as an ATF. Accordingly, for each sound source there is a corresponding ATF. Note that the sound source may be, e.g., someone or something generating sound in the local area, the user, or one or more transducers of the transducer array 310. The ATF for a particular sound source location relative to the sensor array 320 may differ from user to user due to a person's anatomy (e.g., ear shape, shoulders, etc.) that affects the sound as it travels to the person's ears. Accordingly, the ATFs of the sensor array 320 are personalized for each user of the audio system 300.

In some embodiments, the transfer function module 350 determines one or more HRTFs for a user of the audio system 300. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 350 may determine HRTFs for the user using a calibration process. In some embodiments, the transfer function module 350 may provide information about the user to a remote system. The user may adjust privacy settings to allow or prevent the transfer function module 350 from providing the information about the user to any remote systems. The remote system determines a set of HRTFs that are customized to the user using, e.g., machine learning, and provides the customized set of HRTFs to the audio system 300.

The tracking module 360 is configured to track locations of one or more sound sources. The tracking module 360 may compare current DOA estimates and compare them with a stored history of previous DOA estimates. In some embodiments, the audio system 300 may recalculate DOA estimates on a periodic schedule, such as once per second, or once per millisecond. The tracking module may compare the current DOA estimates with previous DOA estimates, and in response to a change in a DOA estimate for a sound source, the tracking module 360 may determine that the sound source moved. In some embodiments, the tracking module 360 may detect a change in location based on visual information received from the headset or some other external source. The tracking module 360 may track the movement of one or more sound sources over time. The tracking module 360 may store values for a number of sound sources and a location of each sound source at each point in time. In response to a change in a value of the number or locations of the sound sources, the tracking module 360 may determine that a sound source moved. The tracking module 360 may calculate an estimate of the localization variance. The localization variance may be used as a confidence level for each determination of a change in movement.

The beamforming module 370 is configured to process one or more ATFs to selectively emphasize sounds from sound sources within a certain area while de-emphasizing sounds from other areas. In analyzing sounds detected by the sensor array 320, the beamforming module 370 may combine information from different acoustic sensors to emphasize sound associated from a particular region of the local area while deemphasizing sound that is from outside of the region. The beamforming module 370 may isolate an audio signal associated with sound from a particular sound source from other sound sources in the local area based on, e.g., different DOA estimates from the DOA estimation module 340 and the tracking module 360. The beamforming module 370 may thus selectively analyze discrete sound sources in the local area. In some embodiments, the beamforming module 370 may enhance a signal from a sound source. For example, the beamforming module 370 may apply sound filters which eliminate signals above, below, or between certain frequencies. Signal enhancement acts to enhance sounds associated with a given identified sound source relative to other sounds detected by the sensor array 320.

The calibration module 380 is configured to calibrate the transducer array 310. The calibration module 380 provides instructions to the transducer array 310 to presents an audio calibration signal to the user. The calibration module 380 receives the responsive electrical signals that are measured by the electrodes in the sensor array 320. Based on the received electrical signals, the calibration module 380 determines an ASSR of the user. The calibration module 380 uses the determined ASSR along with a machine learning model to determine a value for one or more audio filter parameters of the audio system. Subsequently, the calibration module 380 provides the determined audio filter parameter values to the sound filter module 390 for generating the calibrated sound filters.

The instructions provided by the calibration module 380 to present calibration signals are such as to elicit an ASSR response that are measured by the electrode assembly, and may be, e.g., an amplitude modulated (AM) or frequency-modulated (FM) tones with different carrier frequencies (CF), amplitude modulated speech, amplitude modulated music, amplitude modulated noise, a chirp, click, some other sound, or some combination thereof, in accordance with instructions received from the audio controller. For example, in the case of AM or FM tones, the carrier frequency is associated with the region in the cochlea (inner ear) where the hair cells are activated in response to the stimulus. For example, if a 1000 Hz CF tone is used to elicit the ASSR, the portion of the basilar membrane that is activated is the one best tuned to 1000 Hz. In some embodiments, the CF tones that may be used to record the ASSR are 500, 1000, 2000, and 4000 Hz. In some embodiments, the ASSR may be evoked using a pure tone with a frequency of 1000 Hz that is amplitude modulated at 40 Hz. In some embodiments, the tones are presented simultaneously using slightly shifted modulations (that may be faster than a single tone presentation). For example, 500, 1000, 2000, and 4000 Hz tones may be simultaneously presented and at both ears by presenting slightly shifted modulations, e.g. 39.2, 39.4, 39.6, 39.8 Hz at the left ear and 40.0, 40.2, 40.4, 40.6 Hz at the right ear without too much overlap of the ASSR responses. The corresponding different ASSR responses may then be filtered out.

In some embodiments, the instructions provided by the calibration module 380 may include a period of time for which to present an audio calibration signal (e.g., an amplitude modulated tone). The period of time is based in part on how long it typically takes to evoke a measurable electrical response to the audio calibration signal. Different audio calibration signals may be associated with different lengths of time. For example, one type of audio calibration signal may be presented over several minutes, whereas a different time may be presented over a few seconds. In some embodiments where a single frequency amplitude-modulated tone is used, the amplitude of the ASSR increases as stimulus duration decreases. In these embodiments, brief periods (in the order of 2-6 msec) may be used to improve signal to noise ratio (SNR). Increasing the averaging time (recording time), generally increases a probability of detecting the ASSR. Since motion of the user may cause some noise in the data, during calibration, the audio system may provide verbal or visual instructions to the user to remain quiet and stay still for a specified period. In some embodiments, the calibration module 380 may provide instructions to the transducer array 310 to present a plurality of audio calibration signals (e.g., a same tone a plurality of times, a series of different tones, etc.) in a predefined sequence.

The calibration module 380 receives the detected signals from the sensor array 320. In some embodiments, the calibration module 380 may determine, based on the received signals, that the headset is incorrectly positioned on the head of the user. The calibration module may indicate the determined incorrect positioning to the user via a user interface associated with the headset (e.g., display assembly 530 on FIG. 5). In some embodiments, the calibration module 380 may resend the audio calibration signals to the user and restart the calibration process.

The calibration module 380 determines the ASSR of the user using the measured electrical signals received from the plurality of electrodes in the sensor array 320. In some embodiments, the magnitude of the ASSR is used by the calibration module 380 for determining the filter parameters. The magnitude of the ASSR corresponds to the combined effects of the characteristics of the transducer array 310, the coupling of the transducer array 310 to the ear of the user, and also any potential hearing loss experienced by the user. With the determined ASSR data, calibration module 380 performs audio equalization of the audio system that is customized for the user, such that the perception of sound at different frequencies by the user will be equalized.

The calibration module 380 determines one or more values for sound filter parameters using the determined ASSR. The determined values are provided by the calibration module 380 to the sound filter module 390. The sound filter parameter values are used by the sound filter module 390 to generate calibrated and equalized sound filters which are then provided to the transducer array 310 to generate calibrated audio content to the user. A filter parameter may be, e.g., a filter type (e.g., high pass, low pass, etc.), a center frequency location, a width of a frequency band centered around the frequency location (e.g., determined by a quality factor and/or filter order), a depth at the frequency location (e.g., gain), or some combination thereof. For example, if the user has some degrees of hearing loss at a particular frequency, calibration module 380 may adjust filter parameters to compensate for that loss. As an example, if the user has 10 dB of hearing loss at 2 kHz and 25 dB of hearing loss at 4 kHz, the filter parameters are adjusted to have a gain of 10 dB at 2 kHz and a gain of 25 dB at 4 kHz, such that the user's hearing loss in those frequency bands is compensated.

The calibration module 380 determines the one or more values of the filter parameters using a model. The calibration module 380 may retrieve the model from the data store 335. The retrieved model may map various ASSR measurements to corresponding one or more filter parameter values. The model may be, e.g., a machine learning model, a look-up table, etc. In some embodiments, the model may be generated using both ASSR and ground truth hearing threshold (or audiogram) data for a population of subject users of the headsets. The ASSR and ground truth hearing threshold data may be determined for this population and stored in a database. The stored data may be used to train a machine learning model at a mapping server (such as the mapping server 525 in FIG. 5). The audio system 300 may retrieve the model from the mapping server and store it at the datastore 335 for use by the calibration system 380.

The sound filter module 390 determines sound filters for the transducer array 310. In some embodiments, the sound filters cause the audio content to be spatialized, such that the audio content appears to originate from a target region. The sound filter module 390 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 390 calculates one or more of the acoustic parameters. In some embodiments, the sound filter module 390 may generate spatial signal enhancement filters based on the calculated acoustic parameters to provide to the transducer array 310.

In some embodiments, the sound filter module 390 receives filter parameter values determined by the calibration module 380, based on the ASSR readings of the user during calibration. The sound filter module 390 generates one or more sound filters based on the received filter parameter values. These sound filters generated by the sound filter module 390 are calibrated and equalized for the user when wearing the headset.

The sound filter module 390 provides the generated sound filters to the transducer array 310. In some embodiments, the sound filters may cause positive or negative amplification of sounds as a function of frequency. In some embodiments, the generated sound filters may be used by the transducer array 310 to generate filtered audio signals for the one or more frequency bands.

FIG. 4 is a flowchart for calibrating an audio system, in accordance with one or more embodiments. The process shown in FIG. 4 may be performed by components of an audio system (e.g., calibration module 380 located in the audio system 300 depicted in FIG. 3). Other entities may perform some or all of the steps in FIG. 4 in other embodiments. Embodiments may include different and/or additional steps or perform the steps in different orders.

The audio system presents 410 audio an audio calibration signal to a user via one or more transducers of a plurality of transducers on a headset. The transducers may be any of speakers, bone conduction transducers cartilage conduction transducers. The presented audio calibration signals may be any of an amplitude modulated tone, an amplitude modulated noise signal, a frequency modulated tone with one or more different carrier frequencies, a chirp, a click, or some combination of these.

The audio system measures 420 electrical signals generated at a head of the user in response to the presented audio calibration signal. The signals are generated as neural potentials on the head of the user and are detected by electrodes in an electrode assembly that is part of the sensor array located on the headset worn by the user. The electrodes may be electroencephalogram (EEG) electrodes that respond to the neural potentials. In the electrode assembly, at least one of the electrodes is a reference electrode and there is a plurality of data electrodes. The placement of the electrodes on the headset involves choosing a spacing between the data electrodes and the one or more reference electrodes to ensure stable determination of the ASSR. In some embodiments, the measured signals may be used to by the audio system to determine incorrect positioning of the headset on the head of the user. The audio system may indicate the determined incorrect positioning to the user via a verbal or visual interface associated with the headset.

The audio system determines 430 the ASSR of the user based on the measured electrical signals. The audio system may combine the detected signals from the plurality of electrodes that are distributed on the headset in determining the ASSR.

The audio system determines 440 a value for one or more sound filter parameters based on the determined ASSR and a model. The model may be a mapping of different ASSRs to corresponding one or more sound filter parameter values. The mapping may be stored as one or more look-up tables. The audio system may determine the sound filter values for the determined ASSR by retrieving the sound filter parameter values from the stored look-up tables. In some embodiments, the model may be a machine learning model that is trained at a remote location. The trained machine learning model may be stored at a mapping server, and the stored one or more look-up tables are generated from the trained machine learning model and stored at the mapping server from which the audio system may retrieve them.

The audio system calibrates 450 at least one of the transducers of the plurality of transducers on the headset based on determined sound filter parameters. The audio system generates one or more sound filters based on the determined value for the one or more sound filter parameters and provides the generated sound filters to the at least one transducer of the plurality of transducers.

The audio system provides 460 audio content to the user using the calibrated transducers of the plurality of transducers. The audio content that is provided to the user using the calibrated transducers compensates for any hearing loss or hearing impairment of the user.

Figure 5:
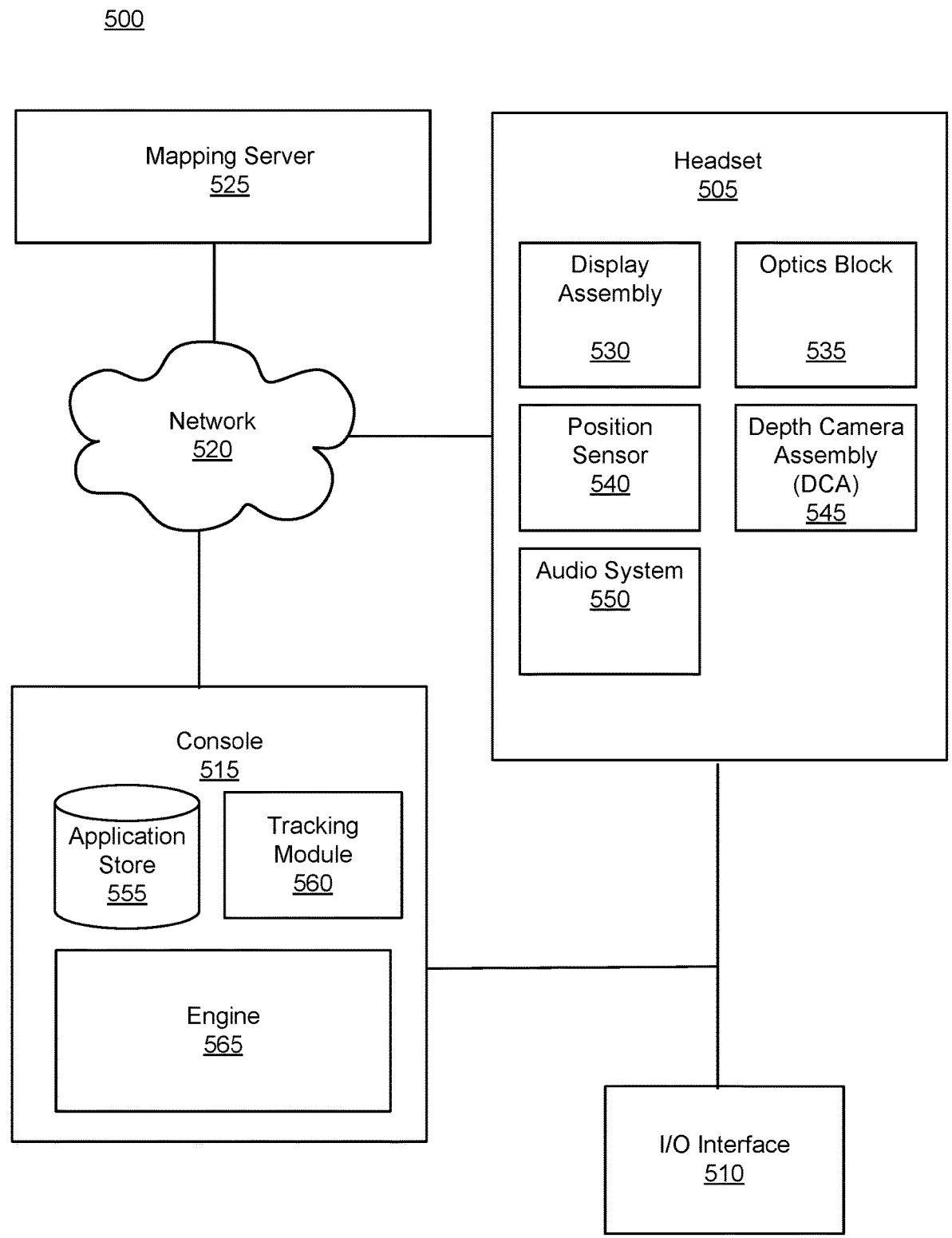
FIG. 5 is a block diagram of a system environment that includes a headset with an audio system and a console, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. In some embodiments, the headset 505 may be a client device The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the audio server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, and the DCA 545. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 190 is an embodiment of the position sensor 540. Examples of a position sensor 540 include: one or more IMUS, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The audio system 550 provides audio content to a user of the headset 505. The audio system 550 is substantially the same as the audio system 300 describe above. The audio system 550 may include a sensor array with one or more acoustic sensors as well as a plurality of electrodes forming an electrode assembly, a transducer array including one or more transducers, and an audio controller.

The audio system 550 provides equalized and calibrated acoustic content to the transducer array for presenting acoustic content to the user via the headset 505. The calibration of the transducer array is performed by the audio system 550. The calibration involves the audio system 550 presenting a calibration signal to the user via the headset. The audio system 550 measures electrical potentials across the head of the user that are evoked in response to the calibration signals using the electrodes in the electrode assembly. The audio system 550 then uses the measured electrical potentials to determine an ASSR of the user. The audio system 550 uses the determined ASSR to obtain values for sound filter parameters using a model which may be a trained machine learning model, a look-up table, etc. The obtained values for the sound filter parameters are subsequently used by the audio system to generate the sound filters. The audio system 550 uses these sound filters to present calibrated and equalized acoustic content to the user via the headset. The audio system 550 may provide spatialized audio content to the user.

In some embodiments, the audio system 550 may request some acoustic parameters from the mapping server 525 over the network 520. The acoustic parameters describe one or more acoustic properties (e.g., room impulse response, a reverberation time, a reverberation level, filter length, etc.) of the local area. The audio system 550 may provide information describing at least a portion of the local area from e.g., the DCA 545 and/or location information for the headset 505 from the position sensor 540. The audio system 550 may generate one or more sound filters using one or more of the acoustic parameters received from the mapping server 525 and use the sound filters to provide audio content to the user.

The audio system 550 may also request the model (e.g., a machine learning model, look-up table, etc.) that establishes the relationship between the ASSR values and filter parameter values from the mapping server 525 over the network 520. In some embodiments, the audio system 550 may periodically receive an updated model of the ASSR values and filter parameter values from the mapping server 525 over the network 520. The audio system 550 may generate one or more sound filters using the received model from the mapping server 525 and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the audio server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may store a model that establishes a mapping between measured ASSR with sound filter parameter values. The model may be a machine learning model, a look-up table, etc. In some embodiments described herein, the mapping server 525 may generate, update, maintains, or some combination thereof, of the data associated with the model by a mapping system.

The mapping system may include a means to present audio calibration signals to a test user across a population of test users, and an electrode assembly to measure responsive electrical signals generated on a head of the test user. The mapping system may present the audio calibration signals from a plurality of varying locations relative to the test user. The mapping system may present a plurality of different audio calibration signals (e.g., an amplitude modulated (AM) tone, an amplitude modulated noise signal, a frequency modulated tone with one or more different carrier frequencies, a click, a chirp, etc., or some combination therein) to the test user and measure responsive electrical signals with the electrode assembly. The mapping system is also configured to receive one or more indications from the test user that they are perceiving the sound (e.g., via a clicker or some other input device). The mapping system may determine ASSR values for the test users using the collected data.

In some embodiments, the mapping system may extrapolate the measurements to provide individualization for all frequencies and magnitudes to determine the ASSR. The mapping system may generate a set of values of sound filter parameters based on the determined ASSR. For example, in some embodiments, the mapping system may generate a set of filter parameters that act to equalize audio content for the test user. The mapping system may then map the ASSR of the test user to the corresponding set of filter parameters. The mapping system may do this for a large population of test users (e.g., hundreds of test users), and generate a model that maps specific a specific ASSR produced by a specific audio calibration signal to one or more values of sound filter parameters.

In some embodiments, empirical information obtained from the population of test users may be used by the mapping system to train machine learning and/or deep learning models, such as regression models, reinforcement models, neural networks, encoder/decoder models such as auto-encoders, etc., to establish the correlation between ASSR values and signal filter parameter values. In these embodiments, the determined ASSR values and empirically determined filter values may be used to train the machine learning model.

The mapping system may generate, update, and maintain the model on the mapping server 525. In some embodiments, the model may be maintained as a function that maps ASSR values to one or more sound filter parameter values. In some embodiments, the model may be maintained as a look-up table that maps the ASSR values to one or more sound filter parameter values. The mapping server 525 may send the model to the audio system 550 through the network 520 upon receiving a request from the audio system 550. In some embodiments, the mapping server 525 may periodically push an updated model to the audio system 550.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner Additional Configuration Information The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    presenting an audio calibration signal to a user via one or more transducers of a plurality of transducers on a headset;
    measuring electrical signals generated at a head of the user in response to the presented audio calibration signal;
    determining an auditory steady state response (ASSR) of the user based on the measured electrical signals;
    determining a value for one or more sound filter parameters based on the determined ASSR and a model;
    calibrating at least one of the transducers of the plurality of transducers on the headset based on determined sound filter parameters; and
    providing audio content to the user using the calibrated transducers of the plurality of transducers.

2. The method of claim 1, wherein the plurality of transducers comprises one or more of:
    speakers;
    cartilage conduction transducers; and
    bone conduction transducers.

3. The method of claim 1, wherein presenting the audio calibration signal comprises presenting one or more of:
    an amplitude modulated (AM) tone;
    an amplitude modulated noise signal;
    amplitude modulated speech;
    amplitude modulate music;
    a frequency modulated tone with one or more different carrier frequencies;
    a click; and
    a chirp.

4. The method of claim 1, wherein measuring the electrical signals generated at the head of the user in response to the presented audio calibration signal comprises detecting the electrical signals from an electrode assembly comprising a plurality of electrodes.

5. The method of claim 4, wherein detecting signals from the plurality of electrodes comprises combining detected signals from the plurality of electrodes that are distributed on the headset, wherein the plurality of electrodes are configured to each be in contact with a portion of the head of the user, wherein at least one electrode in the plurality of electrodes is a reference electrode and there is a plurality of data electrodes in the plurality of electrodes, and wherein a spacing between the data electrodes and the one or more reference electrodes is chosen to ensure stable determination of the ASSR.

6. The method of claim 1, wherein determining the value for the one or more sound filter parameters based on the determined ASSR and the model comprises retrieving the one or more sound filter parameters from the model based on the determined ASSR, wherein the model maps different ASSRs to corresponding one or more sound filter parameter values.

7. The method of claim 6, wherein retrieving the one or more sound filter parameters from the model based on the determined ASSR comprises retrieving the one or more sound filter parameter values from stored one or more look-up tables, wherein the stored one or more look-up tables provide a mapping of ASSR values to the one or more sound filter parameters.

8. The method of claim 7, wherein the model is a machine learning model and the stored one or more look-up tables are generated from the trained machine learning model.

9. The method of claim 7, wherein the machine learning model is trained based on obtaining test data from a population of test users, the obtaining comprising:
    presenting audio content to each test user of the population of test users; and
    recording responses from each test user of the population of test users.

10. The method of claim 1, wherein calibrating at least one of the transducers of the plurality of transducers on the headset comprises:
    generating sound filters based on the determined value for the one or more sound filter parameters; and
    providing the generated sound filters to the at least one transducer of the plurality of transducers.

11. A non-transitory computer-readable storage medium comprising computer program instructions that, when executed by a computer processor of an audio system, cause the audio system to perform steps comprising:
presenting an audio calibration signal to a user via one or more transducers of a plurality of transducers on a headset;
measuring electrical signals generated at a head of the user in response to the presented audio calibration signal;
determining an auditory steady state response (ASSR) of the user based on the measured electrical signals;
determining a value for one or more sound filter parameters based on the determined ASSR and a model;
calibrating at least one of the transducers of the plurality of transducers on the headset based on determined sound filter parameters; and
providing audio content to the user using the calibrated transducers of the plurality of transducers.

12. The non-transitory computer-readable storage medium of claim 11, wherein the plurality of transducers comprises one or more of:
speakers;
cartilage conduction transducers; and
bone conduction transducers.

13. The non-transitory computer-readable storage medium of claim 11, wherein presenting the audio calibration signal comprises presenting one or more of:
an amplitude modulated (AM) tone;
an amplitude modulated noise signal;
amplitude modulated speech;
amplitude modulate music;
a frequency modulated tone with one or more different carrier frequencies;
a click; and
a chirp.

14. The non-transitory computer-readable storage medium of claim 11, wherein measuring the electrical signals generated at the head of the user in response to the presented audio calibration signal comprises detecting the electrical signals from an electrode assembly comprising a plurality of electrodes.

15. The non-transitory computer-readable storage medium of claim 14, wherein detecting signals from the plurality of electrodes comprises combining detected signals from the plurality of electrodes that are distributed on the headset, wherein the plurality of electrodes are configured to each be in contact with a portion of the head of the user, wherein at least one electrode in the plurality of electrodes is a reference electrode and there is a plurality of data electrodes in the plurality of electrodes, and wherein a spacing between the data electrodes and the one or more reference electrodes is chosen to ensure stable determination of the ASSR.

16. The non-transitory computer-readable storage medium of claim 11, wherein determining the value for the one or more sound filter parameters based on the determined ASSR and the model comprises retrieving the one or more sound filter parameters from the model based on the determined ASSR, wherein the model maps different ASSRs to corresponding one or more sound filter parameter values.

17. The non-transitory computer-readable storage medium of claim 16, wherein retrieving the one or more sound filter parameters from the model based on the determined ASSR comprises retrieving the one or more sound filter parameter values from stored one or more look-up tables, wherein the stored one or more look-up tables provide a mapping of ASSR values to the one or more sound filter parameters.

18. The non-transitory computer-readable storage medium of claim 17, wherein the model is a machine learning model and the stored one or more look-up tables are generated from the trained machine learning model.

19. The non-transitory computer-readable storage medium of claim 11, wherein calibrating at least one of the transducers of the plurality of transducers on the headset comprises:
generating sound filters based on the determined value for the one or more sound filter parameters; and
providing the generated sound filters to the at least one transducer of the plurality of transducers.

20. An audio system comprising:
a transducer assembly that includes a plurality of transducers that are positioned on a head mounted system, the plurality of transducers configured to present an audio calibration signal to a user;
an electrode assembly that includes a plurality of electrodes that are positioned on the head mounted system, the plurality of electrodes configured to measure electrical signals generated within a head of the user in response to the audio calibration signal; and
a controller within the head mounted system, the controller configured to:
determine an audio steady state response (ASSR) of the user using the measured electrical signals,
determine a value for a sound filter parameter using the ASSR and a model, wherein the model maps different ASSRs to corresponding values of the filter parameter,
generate a sound filter using the value for the filter parameter, the sound filter calibrating at least one transducer of the plurality of transducers to the user,
apply the sound filter to audio content to generate calibrated audio content, and
instruct the transducer assembly to present the calibrated audio content.

* * * * *